May 23, 1967 W. B. THOMSON 3,321,378

FUEL ELEMENT FOR A NUCLEAR REACTOR

Filed Nov. 22, 1966

INVENTOR.
Wallace B. Thomson
BY
Attorney 3,321,378
FUEL ELEMENT FOR A NUCLEAR REACTOR
Wallace B. Thomson, Northridge, Calif., assignor to the United States of America as represented by the United States Atomic Energy Commission
Filed Nov. 22, 1966, Ser. No. 596,341
5 Claims. (Cl. 176—73)

The invention described herein was made in the course of, or under, a contract with the United States Atomic Energy Commission.

This invention relates to a fuel assembly for a nuclear reactor. In more detail the invention relates to a rotating disk fuel assembly for a compact, air-cooled nuclear reactor.

Nuclear reactors have been described which incorporate a plurality of stacks of spaced rotating fuel plates which overlap to form an active region or core wherein a critical concentration of fissionable material is present. The fuel plates rotate to shift the heated portion thereof away from the core and into the path of a coolant. Patent No. 3,047,486, issued July 31, 1962, to G. H. Hanson, describes a sodium-cooled reactor of this type. Accordingly, in still more detail the invention relates to a fuel assembly for an air-cooled reactor of this type.

A fuel assembly constructed according to the present invention finds particular utility in a compact, high-performance, air-cooled nuclear reactor suitable for use wherever relatively low weight is of critical importance and the problems and limitations associated with liquid-coolant systems militate against their utility. The fuel assembly thus finds utility in an aircraft power plant or wherever the reactor must be transported a long distance as a unit before being set up.

It is accordingly an object of the present invention to develop a fuel assembly for a compact, air-cooled nuclear reactor.

It is a more detailed object of the present invention to develop a rotating disk fuel assembly for a circulating fuel, air-cooled nuclear reactor.

It is another object of the invention to develop a fuel assembly for a nuclear reactor which itself transports heat from the core region to a coolant region of the reactor.

Figure 1:
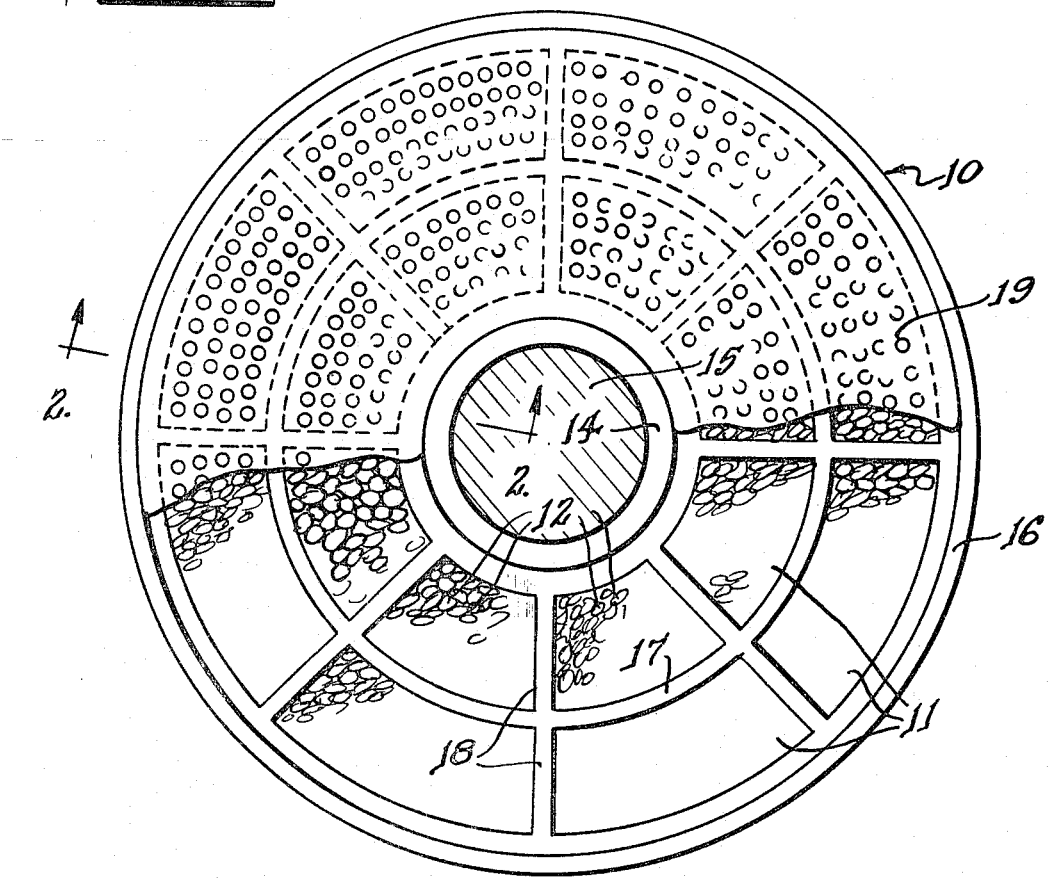
Figure 2:
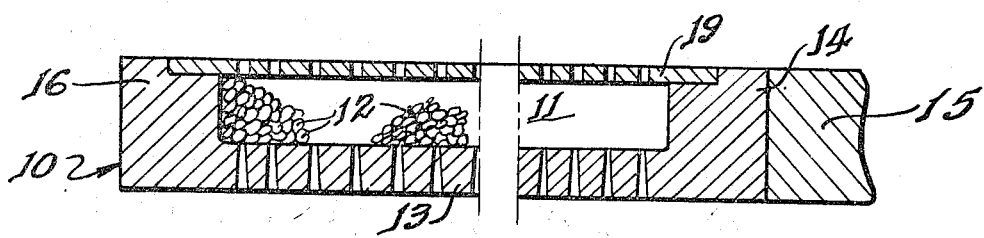

The invention will next be described in connection with the accompanying drawing wherein:

FIG. 1 is a plan view, partly broken away, of a fuel assembly for a nuclear reactor, and FIG. 2 is a section taken on the line 2—2 of FIG. 1.

As shown, the fuel assembly according to the present invention comprises a disk 10 of a solid moderator material. Disk 10 has a plurality of recesses 11 therein each containing a large number of fuel pebbles 12. Disk 10 consists of a perforated moderator plate 13, a centrally located annular hub 14 which surrounds an operating shaft 15, a circumferential rim 16, an annular rib 17 intermediate of hub 14 and rim 16, and a plurality of radial ribs 18. A perforated retaining plate 19, inset in disk 10, which may be formed of steel, is disposed so as to cover each recess 11 to retain fuel pebbles 12 in place.

Specific details of a preferred embodiment of the invention will next be described. Disk 10 is composed primarily of zirconium hydride and has an outer diameter of 64 inches and an inner diameter of 15 inches. The total thickness of disk 10 is two inches with plate 13 being 0.75 inch thick, recess 11 being one inch deep, and plate 19 being 0.25 inch thick. Also rim 16 is two inches wide and hub 14 is 1½ inches wide. While plate 13 is formed entirely of moderator material, hub 14 and rim 16 may contain steel to strengthen the structure.

Fuel pebbles 12 are about 0.10 inch in diameter and consist of mixed beryllium and enriched uranium oxides, and essentially fill recesses 11 to occupy 65% of the space therein. Fuel pebbles 12 are, of course, larger than the perforations in plates 13 and 19. For a reactor 35 inches in length and 25 inches in diameter containing 15 fuel assemblies as described on three shafts, a preliminary machine calculation indicates that 84 pounds of uranium-235 would be a critical mass.

In operation the fuel assembly is rotated at a maximum speed of 260 r.p.m. so that maximum speed at the edge of the assembly is 726 ft./sec. Air is directed by baffles (not shown) inwardly from the circumference of the fuel assembly to the face of the fuel assembly containing moderator plate 13. The air passes through plate 13, then through fuel pebbles 12 and finally through retaining plate 19. The direction of the air then reverses and the air flows radially outwardly where the combined flow of all fuel assemblies in the reactor can, for example, be used to operate a gas turbine.

In operation of the reactor orientation of adjacent fuel assemblies is always reversed. This tends to equalize the pressure and makes it possible to operate control elements in the space between adjacent fuel assemblies in cool inlet air.

A reactor incorporating fuel assemblies of this type and operating as described is very much smaller than a conventional direct-cycle air-cooled reactor. Whereas the effective diameter of a reactor incorporating the fuel assemblies of this invention would be but 25 inches, the diameter of a conventional direct-cycle, air-cooled reactor developing the same power would be 90 inches. Thus shielding would be much more bulky and heavier for the conventional reactor.

There are two definite reasons for this advantageous result. In the first place, a high-density "coolant" such as a beryllium oxide pebble bed in motion can convey large quantities of heat through a small effective flow area. Also a beryllium oxide pebble bed is effective as well in the reflector and shield, where a portion is always located, as in the core.

In addition, the fissionable material required to maintain criticality is very low in comparison to other designs. There are several reasons for this. In the first place, the moderator volume fraction is 0.618, a very high figure. Another reason is that the core size is such as to give minimum critical mass for the given composition. A third reason is that the moderator, being so efficiently cooled, can be used for the disk structure and also needs little or no cladding—so considerable poisonous metal is eliminated. A fourth reason is that what poisonous metal there is, happens to be located "behind" the fuel. That is, thermal neutrons produced in the moderator must traverse the fueled pebble bed before they can be absorbed by the steel support plate.

It will be understood that the invention is not to be limited to the details given herein but that it may be modified within the scope of the appended claims.

What is claimed is:

1. A rotating disk fuel assembly for a compact, air-cooled nuclear reactor comprising a disk formed of a moderating material having a plurality of recesses therein, a large number of small fuel pebbles disposed in each of said recesses, and means for retaining said fuel pebbles in said recesses, said disk having perforations therein to permit cooling air to pass through said disk over said fuel pebbles.

2. A rotating disk fuel assembly according to claim 1 wherein said fuel pebbles are composed of mixed oxides of a fissionable material and moderating material.

3. A rotating disk fuel assembly according to claim 2 wherein said mixed oxides are uranium dioxide and beryllium oxide.

4. A rotating disk fuel assembly according to claim 1 wherein said moderating material is zirconium hydride.

5. A rotating disk fuel assembly according to claim 4 wherein said disk includes a perforated plate forming the bottom of the recesses, a rim disposed at the circumference of the plate and extending thereabove, a hub disposed near the center of the perforated plate and extending thereabove, and a plurality of ribs disposed between said hub and rim and extending above said perforated plate to form said plurality of recesses and a plurality of perforated plates disposed over said recesses to retain the fuel pebbles therein.

References Cited by the Examiner

UNITED STATES PATENTS

| | | | |
|---|---|---|---|
| 2,798,848 | 7/1957 | Kingdon | 176—76 X |
| 2,799,642 | 7/1957 | Hurwitz et al. | 176—76 X |
| 2,812,304 | 11/1957 | Wheeler | 176—28 |
| 2,865,826 | 12/1958 | Stewart | 176—76 X |
| 2,905,611 | 9/1959 | Tonks | 176—76 X |
| 3,047,483 | 7/1962 | Polak | 176—61 X |
| 3,047,486 | 7/1962 | Hanson | 176—61 X |

CARL D. QUARFORTH, *Primary Examiner.*

M. J. SCOLNICK, *Assistant Examiner.*